US008491999B2

(12) United States Patent
Metz et al.

(10) Patent No.: US 8,491,999 B2
(45) Date of Patent: Jul. 23, 2013

(54) METAL-COATED VERTICALLY ALIGNED CARBON NANOFIBERS

(75) Inventors: Kevin Michael Metz, Middleton, WI (US); Robert J. Hamers, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 2078 days.

(21) Appl. No.: 11/521,570

(22) Filed: Sep. 14, 2006

(65) Prior Publication Data

US 2012/0107582 A1 May 3, 2012

(51) Int. Cl.
*B32B 9/00* (2006.01)
(52) U.S. Cl.
USPC .......................................... 428/408; 977/742
(58) Field of Classification Search
USPC .................... 428/408; 423/447.1, 448, 447.2, 423/445 R; 977/742
See application file for complete search history.

(56) References Cited

U.S. PATENT DOCUMENTS

| 6,569,979 B1 | 5/2003 | Strother et al. |
| 2003/0203139 A1 | 10/2003 | Ren et al. |
| 2006/0057388 A1 | 3/2006 | Jin et al. |

FOREIGN PATENT DOCUMENTS

| WO | WO 2004/109837 | 12/2004 |
| WO | WO 2005/069955 | 8/2005 |
| WO | WO 2006/062947 | 6/2006 |
| WO | WO 2006/080702 | 8/2006 |
| WO | WO 2006/099593 | 9/2006 |

OTHER PUBLICATIONS

Shi, Z., et al., "The study of electroless deposition of nickel on graphite fibers," Applied Surface Science 140, 106-110, Sep. 17, 1998.
Ang, L.M., et al., "Decoration of activated carbon nanotubes with copper and nickel," Carbon 38, 363-372, May 6, 1999.
Liu, Z., et al., "Preparation and Characterization of Platinum-Based Electrocatalysts on Multiwalled Carbon Nanotubes for Proton Exchange Membrane Fuel Cells," Langmuir 18, 4054-4060, Feb. 21, 2002.
Lee, C., et al., "Electrically Addressable Biomolecular Functionalization of Carbon Nanotube and Carbon Nanofiber Electrodes," Nano Letters, vol. 4, No. 9, 1713-1716, Jun. 28, 2004.
Arai, S., et al., "Nickel-coated carbon nanofibers prepared by electroless deposition," Electrochemistry Communications 6, 1029-1031, Aug. 27, 2004.
Xing, Y., "Synthesis and Electrochemical Characterization of Uniformly-Dispersed High Loading Pt Nanoparticles on Sonochemically-Treated Carbon Nanotubes," J. Phys. Chem. 108, 19255-19259, Oct. 6, 2004.
Wang, F., et al,, "The preparation of multi-walled carbon nanotubes with a Ni-P coating by an electroless deposition process," Carbon 43, 1716-1721, Mar. 13, 2005.

(Continued)

*Primary Examiner* — Maria Veronica Ewald
*Assistant Examiner* — Daniel H Miller
(74) *Attorney, Agent, or Firm* — Bell & Manning, LLC (57) ABSTRACT

The present invention provides electrodes comprised of metal-coated vertically aligned carbon nanofibers. Arrays of vertically aligned carbon nanofibers provide highly accessible, high density templates having large electrochemically active surface areas that may be modified to further increase the surface area of the nanofibers. The methods of the present invention involve functionalizing the surface of the nanofibers and coating the functionalized surface with metal using electroless deposition. The resulting metal-coated nanofibers form highly stable and highly reproducible electrodes having very high surface areas. The electrodes of the present invention are expected to be useful in a variety of applications, including high-density energy storage, i.e., supercapacitors and fuel cells.

18 Claims, 5 Drawing Sheets

00 nm

OTHER PUBLICATIONS

Choi, H., et al., "Spontaneous Reduction of Metal Ions on the Sidewalls of Carbon Nanotubes," J. Am. Chem. Soc. 124, 9058-9059, May 7, 2005.

Qu, L., et al., "Substrate-Enhanced Electroless Deposition of Metal Nanoparticles on Carbon Nanotubes," J. Am. Chem. Soc. 127, 10809-10807, May 27, 2005.

Baker, S., et al., "Covalent Functionalization for Biomolecular Recognition on Vertically Aligned Carbon Nanofibers," Chem. Mater. 17, 4971-4978, Aug. 1, 2005.

Sarkany, A., "Electroless deposition of Au on Ag sol: Oxidation of carbon monoxide and methanol," Colloids and Surfaces A: Physicochem. Eng. Aspects 269, 67-71, Aug. 18, 2005.

Ochanda, F., et al., "Sub-Micrometer-Sized Metal Tubes from Electrospun Fiber Templates," Langmuir 21, 10791-10796, Aug. 26, 2005.

Hull, R., et al., "Pt Nanoparticle Binding on Functionalized Multiwalled Carbon Nanotubes," Chem. Mater. 18, 1780-1788, Jan. 14, 2006.

Yang, D., et al., "Platinum Nanoparticle Interaction with Chemically Modified Highly Oriented Pyrolectic Graphite Surfaces," Chem. Mater. 18, 1811-1816, Feb. 2, 2006.

Written Opinion received in PCT/US2007/078145, Feb. 6, 2008.

International Search Report for PCT/US2007/078145, mailed Feb. 6, 2008.

METAL-COATED VERTICALLY ALIGNED CARBON NANOFIBERS

STATEMENT OF GOVERNMENT RIGHTS

Research funding was provided for this invention by the National Science Foundation under grant No. NSF: 0210806. The United States government has certain rights in this invention.

FIELD OF THE INVENTION

The present invention provides metal-coated vertically aligned carbon nanofibers having very high surface areas and methods of making the metal-coated nanofibers using electroless deposition.

BACKGROUND OF THE INVENTION

High surface area materials have attracted much attention for their potential uses in electrocatalysis, batteries, fuel cells, and sensors. (See Arico, A. S.; Bruce, P.; Scrosati, B.; Tarascon, J. M.; Van Schalkwijk, W., Nanostructured Materials for Advanced Energy Conversion and Storage Devices. *Nature Materials* 2005, 4, (5), 366-377; Baughman, R. H.; Zakhidov, A. A.; de Heer, W. A., Carbon Nanotubes—The Route Toward Applications. Science 2002, 297, (5582), 787-792; Hutchings, G. J.; Haruta, M., A Golden Age Of Catalysis: A Perspective. *Applied Catalysis A-General* 2005, 291, (1-2), 2-5; Jurczakowski, R.; Hitz, C.; Lasia, A., Impedance of Porous Au Based Electrodes. *Journal Of Electroanalytical Chemistry* 2004, 572, (2), 355-366; Wang, J., Carbon-Nanotube Based Electrochemical Biosensors: A Review. *Electroanalysis* 2005, 17, (1), 7-14.) For materials to be useful in these applications they must have large, electrochemically active surface areas. To maintain current trends in minimizations, however, these large surface areas need to be contained in a small volume. Thus, high density is needed in addition to high surface area. Creating high density, high surface area materials that are fully electrochemically active can be a difficult task. As a result, much attention has been given to nanoscale carbon-based materials due to their high surface areas, ability to create high density arrangements and unique chemical and physical properties. (See Baughman, R. H.; Zakhidov, A. A.; de Heer, W. A., Carbon Nanotubes—The Route Toward Applications. *Science* 2002, 297, (5582), 787-792; Dai, H. J., Carbon Nanotubes: Opportunities and Challenges. Surface Science 2002, 500, (1-3), 218-241; Harris, P. J. F., Carbon Nanotube Composites. *International Materials Reviews* 2004, 49, (1), 31-43.) Nanoscale carbon materials are also attractive because they can be combined with metal nanoparticles, or conducting polymers, to form composites with tailored electrical properties.

A particularly interesting class of carbon nanotubes are the vertically aligned carbon nanofibers (VACNFs). Vertically aligned carbon nanofibers are multi-walled carbon nanotubes that are typically grown in a DC plasma, yielding nanofibers that are aligned vertically from the surface. (See Ren, Z. F.; Huang, Z. P.; Xu, J. W.; Wang, J. H.; Bush, P.; Siegal, M. P.; Provencio, P. N. Science 1998, 282, 1105.) The resulting nanofiber "forests" have interesting properties because in addition to providing edge planes along the nanofiber walls, the interstices between the fibers are straight and relatively large, providing a high degree of accessibility to analytes. The presence of well-defined interstices is important because previous studies of many nanostructured, high surface-area carbon materials have found that very small pores cannot support electrical double-layers and diffusion limitations can reduce the effective surface area. (See Frackowiak, E.; Beguin, F. Carbon 2001, 39, 937; de Levie, R. *Electrochimica Acta* 1964, 9, 1231.)

Vertically aligned carbon nanofibers are a promising high surface area, nanoscale carbon material. Vertically aligned carbon nanofibers have similar electrochemical and mechanical properties as other nanoscale carbon materials. The advantage of VACNFs is the ability to control their physical dimensions allowing for large, accessible surface areas. Thus, VACNFs are an ideal platform for modifications leading to increased surface area, such as covalent functionalization with molecular layers and decoration with metal coatings.

Carbon-based nanostructures have been decorated with metal coatings, but the methods employed, the underlying carbon platforms used, and the resulting coated materials suffer from a number of significant drawbacks. Vapor deposition and electrochemical methods have been used to coat nanoporous materials with metals, but these processes clog pores, limiting the surface area of the coated substrates. In contrast, electroless deposition is a more favorable coating technique. In previous studies, however, electroless deposition of metals has involved oxidation of the underlying carbon nanostructures. The relatively harsh oxidation conditions used are both detrimental to the nanostructures and difficult to integrate with the underlying metal electrodes. Furthermore, metal coatings derived from these methods are not uniform and continuous, but consist of discrete metal nanoparticles attached to the surface of the carbon substrates. Finally, the carbon platforms used in these studies have been free-standing, unattached single-walled or multi-walled carbon nanotubes arranged in a spaghetti-like mat. Unlike VACNFs, such structures are not ideal platforms for high surface area electrodes. Therefore, a need exists for a method of decorating carbon nanostructures with uniform metal coatings to provide electrodes with high structural stability and very high surface areas.

SUMMARY OF THE INVENTION

The present invention is directed to electrodes having very high surface areas. The electrodes are based on arrays of vertically aligned carbon nanofibers characterized by interstices between neighboring nanofibers. The electrodes include a continuous, substantially uniform, metal coating on the surface of the nanofibers. The continuous metal coating may be characterized by a microstructure of needle-like projections extending away from the surface of the nanofibers and towards the interstices between adjacent nanofibers. In some instances the microstructures may bridge nanofibers or even fill the interstices between nanofibers. The electrodes may include a layer of organic molecules bound to the surface of the nanofibers, wherein the continuous metal coating is disposed over the organic molecules. The organic molecules may comprise alkyl chains having a terminal reactive moiety, the terminal reactive moiety being a carboxylic acid moiety. The electrodes of the present invention are typically characterized by high capacitance values and high surface areas. The effective surface area of the electrodes may be at least 95 times greater than the surface area of a planar metal electrode comprising the same metal as the continuous metal coating.

The methods of making the present electrodes involve the steps of functionalizing the surface of the nanofibers with organic linker molecules and depositing a continuous metal coating on the functionalized surface using electroless deposition. In some embodiments, the functionalization step comprises reacting substituted and protected alkene molecules with the nanofiber surface to form substituted and protected alkane molecules covalently bound to the nanofiber surface and deprotecting the surface-bound alkane molecules. The electroless deposition step may comprise exposing the functionalized surface to a sensitizing solution, exposing the sensitized surface to an activating solution, and exposing the activated surface to a solution comprising a metal.

The arrays of vertically aligned carbon nanofibers may take on a variety forms, depending upon the exact conditions used to grow the nanofibers. Similarly, the coatings on the surface of the nanofibers may be made from a wide variety of metals.

Further objects, features and advantages of the invention will be apparent from the following detailed description when taken in conjunction with the accompanying drawings.

DETAILED DESCRIPTION OF THE INVENTION

The present invention provides electrodes comprised of metal-coated vertically aligned carbon nanofibers. Arrays of vertically aligned carbon nanofibers provide highly accessible, high density templates having large electrochemically active surface areas that may be modified to further increase the surface area of the nanofibers. The methods of the present invention involve functionalizing the surface of the nanofibers and coating the functionalized surface with metal using electroless deposition. The resulting metal-coated nanofibers form highly stable and highly reproducible electrodes having very high surface areas. The electrodes of the present invention are expected to be useful in a variety of applications, including high-density energy storage, i.e., supercapacitors and fuel cells.

The methods and electrodes of the present invention are based on vertically aligned carbon nanofibers. The nanofibers themselves are desirably a type of multi-walled nanotubes composed of nested, conical graphene sheets. The nested structure exposes substantial amounts of basal and edge plane graphite along the sidewalls of each individual nanofiber, providing nanofibers that are more electrochemically active than many other carbon materials. However, other types of nanofibers, including multi-walled carbon nanotubes composed of concentric tubes may also be used. In the present invention, the carbon nanofibers are attached to substrate surfaces, substantially vertically aligned, and characterized by interstices between neighboring nanofibers, providing arrays of vertically aligned carbon nanofibers that may be coated with metal to form high surface area electrodes. A scanning electron micrograph of a typical array of vertically aligned carbon nanofibers is provided in FIG. 1. As is shown, one end of each nanofiber is attached to the substrate surface, while the other end extends upwardly from, and is aligned substantially perpendicular to, the surface of the substrate. The substrate may be densely packed with vertically aligned nanofibers, but space remains around most nanofibers, providing well-defined, channel-like interstices or pores between neighboring nanofibers. These interstices provide a high degree of accessibility to analytes used for functionalizing or coating the nanofiber surfaces. The organized, brush-like nanofiber arrays of the present invention may be distinguished from collections of nanofibers randomly oriented in spaghetti-like mats.

The length, diameter, and spacing between vertically aligned nanofibers may vary, depending on the exact conditions used to grow the nanofibers. In some embodiments, the nanofibers may be at least 0.5 μm in length. In other embodiments, the nanofibers may be at least 1.5 μm in length and in still further embodiments, the nanofibers may be at least 2.5 μm in length. Similarly, the diameter of an individual nanofiber may vary. In some embodiments, the diameter may be at least 50 nanometers. In other embodiments, the diameter may be at least 75 nanometers, and in further embodiments, the diameter may be at least 100 nanometers. Each individual nanofiber may have a substantially uniform diameter along the entire length of the nanofiber, meaning that the diameter of the nanofiber varies by no more than ±20 nanometers along the entire length of the nanofiber. In other embodiments, the variation is no more than ±15 nanometers. In further embodiments, the variation is no more than ±10 nanometers. Finally, the spacing between nanofibers, as measured from the center of one nanofiber to the center of an adjacent nanofiber may also vary. In some embodiments, the spacing between nanofibers is at least 100 nanometers. In other embodiments, the spacing is at least 150 nanometers. In still further embodiments, the spacing is at least 200 nanometers.

Vertically aligned carbon nanofibers may be grown directly on a wide variety of electrically conductive substrate surfaces, including but not limited to silicon nitride, silicon oxide, silicon, molybdenum, stainless steel, and titanium. The substrates may be covered with thin, multilayer metal films to provide a catalyst for nanofiber growth. Finally, a suitable method for generating the arrays of vertically aligned carbon nanofibers used in the present invention includes DC plasma-enhanced chemical vapor deposition (DC-PECVD). The selection of appropriate plasma conditions may vary, but typical conditions are provided in Example 1.

The electrodes of the present invention comprise an array of vertically aligned carbon nanofibers and a continuous metal coating on the surface of the nanofibers. The metal-coated nanofibers of the present invention may be distinguished from carbon nanostructures having discrete metal nanoparticles or metal nanoclusters attached to their surfaces. In such structures, the coating is discontinuous leaving portions of the nanofiber surface exposed between nanoparticles or nanoparticle clusters. The present invention is capable of providing metal-coated carbon nanofibers with a continuous metal sheath spanning at least a portion of, and in some embodiments, the entire length of the nanofibers. The thickness of the continuous metal coating may vary. Assuming an average uncoated nanofiber diameter of approximately 80 nanometers, the diameter of the metal-coated nanofibers is at least 100 nanometers in some embodiments of the present invention. In other embodiments, the diameter of the metal-coated nanofibers is at least 120 nanometers. In still other embodiments, the diameter of the metal-coated nanofibers is at least 160 nanometers. In some embodiments, the diameter of the metal-coated nanofibers is substantially uniform along the length of the nanofibers. By uniform, it is meant that the variation in the diameter of the metal-coated nanofibers along the length of the coated portion of the nanofiber is within a specified range. For example, in some embodiments, the diameter of the metal-coated nanofibers varies by not more than ±15 nanometers along the metal-coated portions. In other embodiments, the variation is not more than ±10 nanometers. In still other embodiments, the variation is not more than ±5 nanometers.

In some embodiments of the present invention, the continuous metal coatings comprise a fine metal microstructure characterized by needle-like projections, the projections extending away from the surface of the nanofibers and towards the interstices between neighboring nanofibers. The needle-like projections, shown clearly in FIGS. 4E and 4F, generally have a wider base at the point of attachment to the surface of the nanofiber and extend to a pointed tip in the interstices between nanofibers. The length of the projections may vary. In some embodiments, the microstructure is characterized by projections that are at least 10 nanometers in length. In other embodiments, the projections are at least 20 nanometers in length. In still other embodiments, the projections are at least 50 nanometers in length. As described in Example 3, the growth of the microstructure is a function of exposure time in the metal baths used to coat the nanofibers. In some embodiments, at least some of the microstructure's needle-like projections form bridges in the interstices and connect neighboring nanofibers, as shown in FIG. 4F. In other embodiments, the needle-like projections substantially fill the interstices between neighboring nanofibers, as shown in FIG. 4G.

The electrodes of the present invention desirably exhibit high metal loading, where metal loading is a measure of the weight of the metal as a percentage of the total weight of the system. In some embodiments, the metal-coated nanofibers have a loading of at least 30 weight percent (wt. %). In other embodiments, the metal-coated nanofibers have a loading of at least 50 wt. %. In still other embodiments, the metal-coated nanofibers have a loading of at least 75 wt. %.

A wide variety of metals may be used to coat the arrays of vertically aligned carbon nanofibers. Suitable metals include Ag, Au, Pd, Pt, Rh, Cu, Ni, or combinations thereof.

In some embodiments, the electrodes of the present invention further comprise a layer of organic linker molecules covalently bound to the surface of the nanofibers, and underlying the metal coating. In this embodiment, the continuous metal coating is associated with the surface-bound molecules. In the present context, the term "layer" is not intended to indicate a continuous film. Rather the term refers to a plurality of organic molecules bound to the surface and edges of the nanofibers. The methods of the present invention are capable of providing vertically aligned nanofibers comprising a monolayer of covalently bound organic molecules. The organic linker molecules are characterized in that they are covalently bound to the carbon nanofiber surface at one end and further include a terminal reactive moiety, capable of binding metal ions at the other end. The metal ions include those that are used in the sensitization step of the electroless deposition process described below. Finally, the electrodes of the present invention may further comprise these metal ions, including tin ions.

The metal-coated vertically aligned carbon nanofibers of the present invention typically exhibit much greater capacitance values than planar metal electrodes comprised of the same metal as the metal coatings. The capacitance values of the electrodes may be as large as 500 $\mu F/cm^2$, 600 $\mu F/cm^2$, or even as large as 3000 $\mu F/cm^2$. This reflects the fact that the effective surface area of the electrodes, as calculated in Example 3, are much greater than the surface areas of planar metal electrodes comprised of the same metal as the metal coatings. In some embodiments, the effective surface area of the electrodes is at least 10 times greater than an equivalent planar metal electrode. In other embodiments, the increase is at least 50 times and in still other embodiments, the increase is at least 95 times.

The methods of the present invention involve functionalizing the surface of vertically aligned carbon nanofibers with organic linker molecules and depositing a continuous metal coating on the functionalized surface using electroless deposition. The functionalization steps of the present invention do not involve oxidation of bare carbon substrates in acidic solutions, as do the prior art methods. By functionalizing vertically aligned carbon nanofibers with small molecules having terminal reactive moieties, rather than oxidizing the surfaces, a high surface coverage of such moieties can be achieved, allowing for a high nucleation density in subsequent metal decoration steps. Electroless deposition provides uniform and continuous metal coatings along the entire surface of the vertically aligned carbon nanofibers. This represents a significant improvement over metal coatings on randomly oriented, spagetti-like mats of nanofibers, wherein pores at the top of the mat quickly become clogged with metal, preventing the metal coating from reaching lower lying nanofibers.

Figure 2:
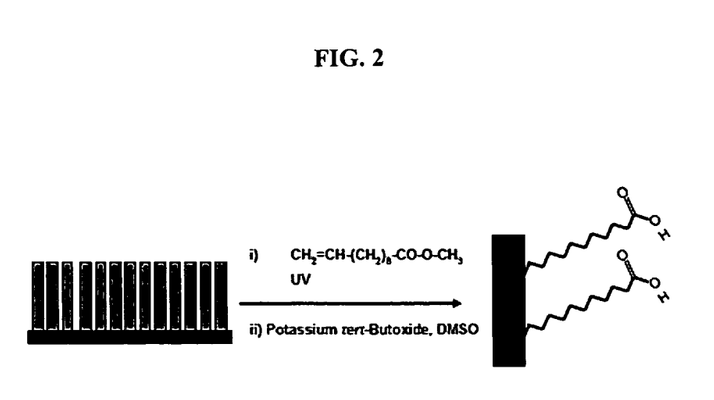
FIG. 2 depicts a reaction scheme for the functionalization of vertically aligned carbon nanofibers with terminal reactive moieties.

In a first step, shown in FIG. 2, the carbon nanofiber surface is functionalized with covalently bound linker molecules. In some embodiments, the linker molecules comprise alkyl chains having a terminal reactive moiety. The alkyl chains may be straight, branched, or cyclic. In some embodiments, the terminal reactive moiety is a carboxylic acid moiety or an aldehyde. Other reactive moieties include other anionic functional groups, such as phosphates, phosphonic acids, silanols and nitrates. In some embodiments, the linker molecules have the formula —$(CH_2)_n$—R, wherein n is an integer from 1 to 20 and R is carboxylic acid. A description of a method that may be used to carry out this functionalization step is provided in U.S. Pat. No. 6,569,979, the entire disclosure of which is incorporated herein by reference. Briefly, functionalization may comprise reacting substituted and protected alkene molecules with an unoxidized carbon nanofiber surface to form substituted and protected alkane molecules covalently bound to the surface and then deprotecting the surface-bound alkane molecules. The reaction may be photoinitiated. A suitable substituted and protected alkene molecule is undecylenic acid methyl ester. The terminal double bonds of this alkene are capable of forming covalent bonds to the surface of unoxidized carbon nanofibers when exposed to UV light. Subsequent deprotection provides a monolayer of alkyl chains having terminal carboxylic acid moieties covalently bound to the surface of the vertically aligned carbon nanofibers.

A second method of functionalization involves reacting the nanofibers with aryldiazonium compounds via chemical or electrochemical grafting. Such methods are described in Sarah E. Baker, Kiu-Yuen Tse, Eve Hindin, Beth M. Nichols, Tami Lasseter Clare, and Robert J. Hamers, "Covalent Functionalization for Biomolecular Recognition on Vertically Aligned Carbon Nanofibers", Chemistry of Materials, 17, 4971-4978 (2005); and Chang-Soo Lee, Sarah E. Baker, Matthew S. Marcus, Wensha Yang, Mark A. Eriksson, and Robert J. Hamers, "Electrically Addressable Biomolecular Functionalization of Carbon Nanotube and Carbon Nanofiber Electrodes", Nano Letters, 4, 1713-1716 (2004). The use of nitroaryldiazonium salts can be used to functionalize nanofibers with amine groups under electrical control, permitting functionalization of specific groups of nanofibers.

The use of either photochemical or electrochemical patterning methods to functionalize nanofibers is desirable for certain applications because these methods are able to selectively functionalize individual nanofibers, leaving other nanofibers unfunctionalized. Because the metal coatings do not grow on the unfunctionalized nanofibers, the stepwise functionalization and coating of different subsets of nanofibers makes it possible to fabricate complex catalysts in which different sets of nanofibers, in close proximity to one another, are coated with different metals and therefore have different catalytic properties.

Figure 3:
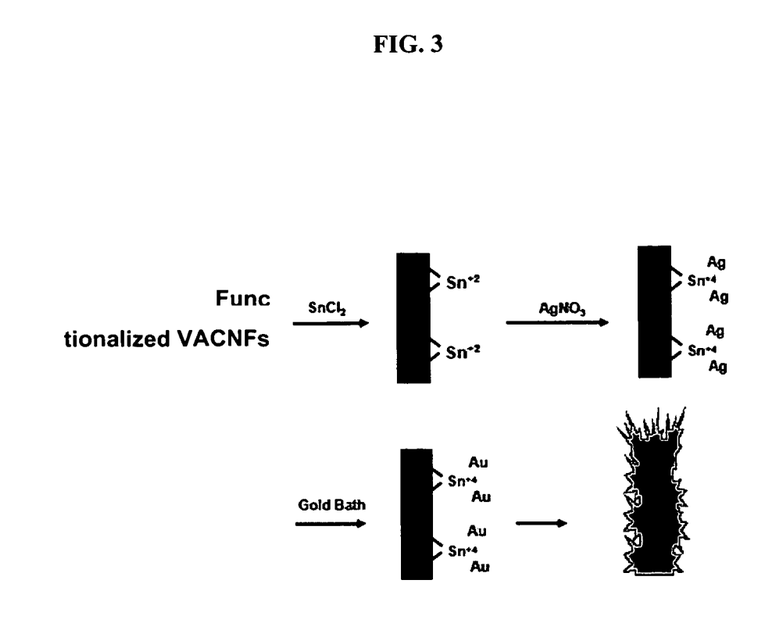
FIG. 3 depicts a reaction scheme for coating functionalized vertically aligned carbon nanofibers with metal using electroless deposition.

In a subsequent step, illustrated in FIG. 3, metal is deposited on the surface of the functionalized carbon nanofibers using electroless deposition. Electroless deposition of metals may be accomplished in a variety of ways. One way involves exposing the functionalized carbon nanofibers to a sensitizing solution, exposing the sensitized nanofiber surface to an activating solution, and exposing the activated nanofiber surface to a solution comprising a metal. Sensitization and activation provide catalytic nucleation centers on the nanofiber surface for metal deposition. A typical sensitizing solution comprises $SnCl_2$. In this case, exposing the functionalized carbon nanofibers to a solution comprising tin ions results in the binding of the tin ions to the surface-bound carboxylic acid moieties. (See Menon, V. P.; Martin, C. R., Fabrication and Evaluation of Nanoelectrode Ensembles. *Analytical Chemistry* 1995, 67, (13), 1920-1928.) A typical activating solution comprises $AgNO_3$. In this case, exposing the sensitized carbon nanofibers to a solution comprising silver ions results in the reduction of silver onto the tin bound to the surface-bound carboxylic acid moieties. Finally, the continuous metal coatings may be formed by exposing the activated nanofiber surface to a solution comprising another metal. Metals suitable for coating the nanofibers include Ag, Au, Pd, Pt, Rh, Cu, Ni, or combinations thereof.

Without wishing to be bound to a particular theory, it is hypothesized that the high capacitance values exhibited by the metal-coated carbon nanofibers of the present invention may be attributable to both the underlying properties of the VACNFs and the formation of the microstructure on the coated nanofibers. Vertically aligned carbon nanofibers already provide a higher surface area template than planar surfaces, which can then be exploited by covering the nanofibers with metal. Once deposited metal fully covers the carbon nanofiber surface, however, any further increases in capacitance are likely due to the growth of the fine metal microstructure on the coated nanofibers. As observed in Example 3, prolonged deposition eventually results in a decrease in active, or accessible, surface area as the space between adjacent nanofibers becomes filled. In accordance with the de Levie model for the impedance of porous electrodes in solution, as the space between adjacent fibers (pore diameter) decreases, the capacitance drops. (See deLevie, R., On Porous Electrodes in Electrolyte Solutions—IV. *Electrochimica Acta* 1964, 9, 1231-1245.)

EXAMPLES

Materials and Methods:

Example 1

Synthesis of Vertically Aligned Carbon Nanofibers

Vertically aligned carbon nanofibers were grown using DC plasma-enhanced chemical vapor deposition (DC-PECVD) in a custom-built chamber. (See Cassell, A. M.; Ye, Q.; Cruden, B. A.; Li, J.; Sarrazin, P. C.; Ng, H. T.; Han, J.; Meyyappan, M. *Nanotechnology* 2004, 15, 9.) The nanofibers shown in FIG. 1 were grown on silicon nitride substrates that were covered with a thin multilayer film consisting of 50 nm of molybdenum, followed by 20 nm of titanium, and finally 20 nm nickel as the top layer. Typical growth conditions used flow rates of 80 standard cubic centimeters per minute (sccm) ammonia and 30 sccm acetylene, with a chamber pressure of 4 torr and a DC power of 360 watts. Under these growth conditions, the nanofibers have an average diameter ~80 nm and are nearly cylindrical and are nearly all vertically aligned. The length of the fibers can be controlled with the time of growth. All fibers used here were grown for 15 minutes, corresponding to a length of ~2 µm.

Example 2

Functionalization of Vertically Aligned Carbon Nanofibers

Vertically aligned carbon nanofibers were functionalized with terminal reactive moieties as illustrated in FIG. 2. Specifically, carbon nanofibers were reacted with undecylenic acid methyl ester (Aldrich) in a quartz covered, nitrogen purged reaction chamber. Functionalization was carried out by sandwiching a drop of the ester between the sample and a small quartz window, used to minimize evaporation. The entire chamber was illuminated with 254 nm UV light for 16 to 18 hours. To remove non-covalently attached reactants, the samples were washed in chloroform for 30 minutes, and then immersed in methanol to rinse. These washing steps were performed twice. The ester was deprotected by reacting the samples in a potassium tert-butoxide slurry in DMSO (~250 mg in ~10 mL) for 5 minutes. Samples were then washed in 0.1 M HCl. Deprotection left the carbon nanofiber surfaces functionalized with terminal carboxylic acid moieties.

Example 3

Preparation of Metal-Coated Vertically Aligned Carbon Nanofibers Using Electroless Deposition Functionalized vertically aligned carbon nanofibers were coated with metal according to the scheme outlined in FIG. 3. Functionalized nanofibers were immersed in methanol and then in a tin sensitizing solution consisting of 0.026M $SnCl_2$, and 0.07M trifluoroacetic acid in a 50:50 methanol:DI $H_2O$ solution for 45 minutes at room temperature. The samples were removed from the tin solution, rinsed by immersion in methanol, and then activated with silver by placing them in 5 mL of ammonical silver nitrate solution (0.03M $AgNO_3$) for 15 minutes. The samples were removed from the silver nitrate solution and rinsed by immersion in methanol. The samples were then placed in individual gold baths in a refrigerator at 6° C. and left for 1 to 22 hours. The gold baths consisted of 0.127M $Na_2SO_3$, 0.025M $NaHCO_3$, 0.625M formaldehyde and 8 mM $Na_2Au(SO_3)_2$ (Technic Oromerse Part B gold solution). The pH of this solution was adjusted to 10 using 1M $H_2SO_4$.

Results

Microstructure of Metal-Coated Nanofibers

Figure 1:
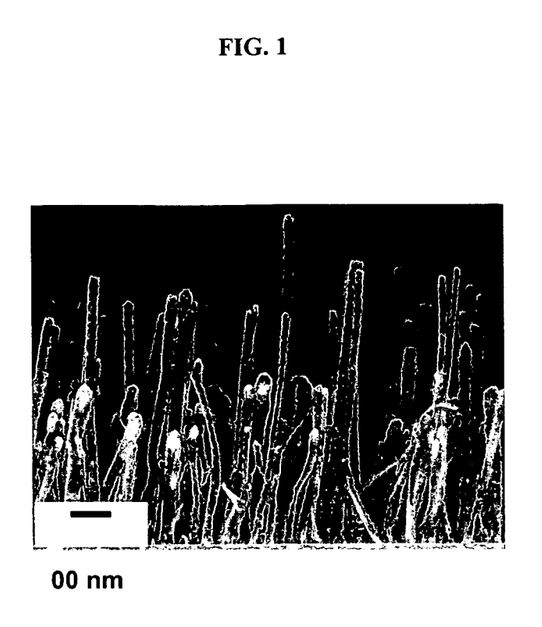
FIG. 1 is a scanning electron microscope image of vertically aligned carbon nanofibers attached to a silicon nitride substrate.
Figure 4:
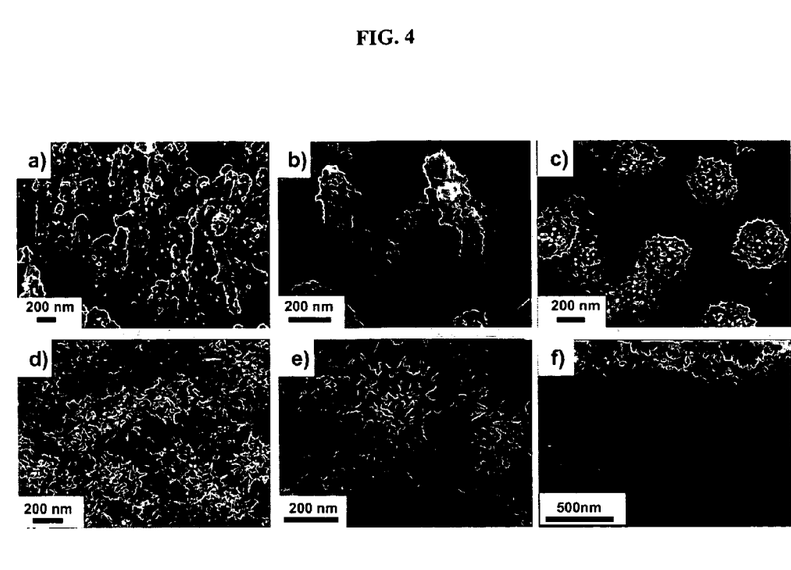
FIG. 4 shows scanning electron microscope images of vertically aligned carbon nanofibers after various exposure times in the gold bath. The exposure times are as follows: A=1 hour, B=3 hours, C=5 hours, D=7.5 hours, E=7.5 hours (higher magnification), F=22 hours.

The deposition of gold on VACNFs was characterized via scanning electron microscopy (SEM). FIG. 4 shows scanning electron micrographs of the VACNFs after various exposure times in the gold bath. FIG. 1 shows a typical carbon nanofiber sample prior to any modifications. As shown in FIG. 4A, small gold clusters have formed on the surface of the VACNFs after 1 hour in the gold bath. FIG. 4B shows that the gold clusters have started to grow together after 3 hours. After 5 hours, they have fully coalesced to form a continuous gold sheath around the carbon nanofibers, spanning the entire length of the nanofiber. FIG. 4C also reveals the formation of a fine metal microstructure on the surface of the coated nanofibers. The microstructure is characterized by needle-like projections extending away from the surface of the nanofibers and towards the interstices between neighboring nanofibers. It is hypothesized that the close packed structure of the underlying carbon nanofibers and the low temperatures used in metal deposition results in a diffusion limited process, which gives rise to the metal microstructure. As evidenced by FIG. 4D and the higher magnification shown in FIG. 4E, the pointed projections become longer and sharper the longer the exposure to the gold bath. After 11 hours in the gold bath, the projections are even longer and sharper. For some samples, the projections from neighboring fibers touch and in other samples, the projections have grown together to form bridges in the interstices between neighboring nanofibers. A cross-sectional analysis of a sample after 22 hours of exposure in the gold bath. FIG. 4F, shows that the interstices between neighboring fibers has been substantially filled in, leaving only a covering of the gold microstructure across the top of the fibers.

SEM analysis also revealed that carbon nanofibers that have been exposed to the gold bath for at least 5 hours remain vertically aligned after wetting and drying. This is an important difference compared to bare carbon nanofibers which bundle after being wetted, most likely due to the surface tension forces during drying. The fact that the gold-coated nanofibers of the present invention do not display this clumping tendency suggests that they have a high structural stability and could be used through multiple wetting and drying cycles.

Electrochemical Properties of Metal-Coated Nanofibers

The electrochemical properties of the gold decorated carbon nanofibers were investigated using electrochemical impedance spectroscopy (EIS). In EIS, a small, 10 mV, AC sinusoidal excitation potential is applied to the cell, and the resulting current is measured at the modulation frequency. (See Macdonald, J. R.; Kenan, W. R., Impedance Spectroscopy-Emphasizing Solid Materials and Systems. 1987.) This produces a frequency spectrum of the electrical response of the system, usually presented as plots of the magnitude (|Z|) and phase angle ($\theta$) of the impedance as a function of frequency. Assuming a series RC model, the capacitance of the system can be extracted from the impedance data with the following equation, $$C = -\frac{1}{2\pi f |Z| \sin\theta}.$$

All EIS measurements were performed using a 3-electrode potentiostat (Solartron 1260) and impedance analyzer (Solartron 1287) using Zplot software (Scribner Associates, Inc.). All measurements were carried out using a 3 electrode cell in 0.1 M KCl solution. Top contacts were made to the gold-coated carbon nanofibers in order for them to be used as the working electrode. A platinum foil counter electrode and a Ag/AgCl reference electrode completed the cell set-up.

Figure 5:
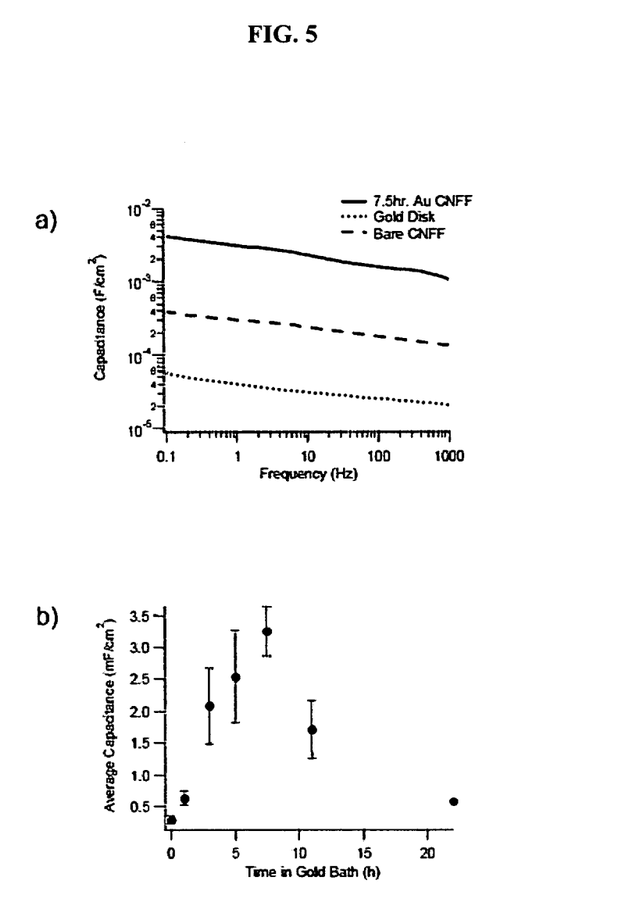
FIG. 5 provides capacitance data for gold-coated vertically aligned carbon nanofibers (solid line), bare vertically aligned carbon nanofibers (dot-dash line), and a planar gold electrode (dotted line). A shows the capacitance of the three surfaces as a function of frequency. B shows the average capacitance of vertically aligned carbon nanofibers after various exposure times in the gold bath.

FIG. 5A shows capacitance as a function of frequency for the 7.5 hour gold-coated carbon nanofibers, bare carbon nanofibers, and a planar gold electrode in 0.1 M KCl. Data were normalized to the projected areas of the working electrode in the measurement. Notably, the capacitance of the gold-coated carbon nanofibers is nearly two orders of magnitude higher than the capacitance of the planar gold micro disk electrode and an order of magnitude higher than the capacitance of the bare carbon nanofibers.

FIG. 5B shows the average capacitance as a function of exposure time in the gold bath determined by fitting the impedance data to an equivalent circuit model consisting of a resistor and capacitor in series and taking the average of the extracted capacitance value from at least three data sets. The average capacitance for carbon nanofibers that had been exposed to a gold bath for 7.5 hours was 3.25 $mF/cm^2$. Capacitance values span from ~630 $\mu F/cm^2$ after one hour, through the peak at 7.5 hours, to ~580 $\mu F/cm^2$ after 22 hours. These values are all higher than the average capacitance of bare carbon nanofibers, ~290 $\mu F/cm^2$. The average capacitance of a planar gold electrode was found to be 33.2 $\mu F/cm^2$, in agreement with the range of values resulting from measurements on planar gold electrodes in various solutions. (See Jurczakowski, R.; Hitz, C.; Lasia, A., Impedance of Porous Au Based Electrodes. *Journal Of Electroanalytical Chemistry* 2004, 572, (2), 355-366.)

The effective increase in surface area can be determined by comparing the capacitance values for gold-coated nanofibers with the capacitance value for a planar gold electrode. Vertically aligned carbon nanofibers exposed to a gold bath for 7.5 hours have an increase in effective surface area of 98 times. For comparison, uncoated vertically aligned carbon nanofibers have an increase in effective surface area of only 8 times compared to planar glassy carbon surfaces. Therefore, the data demonstrate that gold deposition on vertically aligned carbon nanofibers provides electrodes with very high surface areas.

For the purposes of this disclosure and unless otherwise specified, "a" or "an" means "one or more". All patents, applications, references and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

It is understood that the invention is not confined to the particular embodiments set forth herein, but embraces all such forms thereof as come within the scope of the following claims.

What is claimed is:

1. An electrode comprising an array of vertically aligned carbon nanofibers separated by interstices, each nanofiber having a surface wherein the carbon nanofibers are coated by continuous metal coatings, wherein the continuous metal coatings comprise a metal microstructure characterized by needle-like projections, the projections extending away from the surfaces of the nanofibers and towards the interstices between neighboring nanofibers, and further wherein the continuous metal coatings, the metal microstructure and the needle-like projections span the length of the carbon nanofibers.

2. The electrode of claim 1, wherein the needle-like projections form bridges in the interstices between neighboring nanofibers and connect neighboring nanofibers.

3. The electrode of claim 1, wherein the needle-like projections substantially fill the interstices between neighboring nanofibers.

4. The electrode of claim 1, wherein the continuous metal coatings comprise a metal selected from the group consisting of Ag, Au, Pd, Pt, Rh, Cu, or Ni, or combinations thereof.

5. The electrode of claim 1, wherein the metal-coated nanofibers have a percent loading of metal of at least about 50 wt. %.

6. The electrode of claim 1, wherein the diameter of the metal-coated nanofibers varies by not more than ±10 nanometers along the length of the nanofibers.

7. The electrode of claim 1, wherein the electrode has an effective surface area at least 95 times greater than a planar metal electrode comprising the same metal as the continuous metal coating.

8. The electrode of claim 1, further comprising, a layer of organic linker molecules covalently bound to the surfaces of the nanofibers and underlying the continuous metal coatings, the linker molecules having a terminal reactive moiety capable of associating with the continuous metal coatings.

9. The electrode of claim 8, wherein the linker molecules comprise alkyl chains having the terminal reactive moiety.

10. The electrode of claim 8, wherein the linker molecules have the formula $-(CH_2)_n-R$, wherein n is an integer from 1 to 20 and R is a carboxylic acid moiety.

11. The electrode of claim 8, wherein the linker molecules form a monolayer on the surfaces of the nanofibers.

12. The electrode of claim 1, wherein the metal coating on a first set of nanofibers in the array comprises a first metal and the metal coating on a second set of nanofibers in the array comprises a second metal.

13. The electrode of claim 1, wherein the needle-like projections are characterized by a base at the point of attachment to the surface of the nanofiber and a pointed tip extending into the interstices between neighboring nanofibers, wherein the base is wider than the pointed tip.

14. The electrode of claim 1, wherein the nanofibers are unbranched.

15. The electrode of claim 1, wherein the needle-like projections comprise projections characterized by a length of at least 50 nm.

16. The electrode of claim 13, wherein the nanofibers are unbranched.

17. The electrode of claim 13, wherein the needle-like projections comprise projections characterized by a length of at least 50 nm.

18. The electrode of claim 17, wherein the nanofibers are unbranched.

* * * * *